United States Patent
Mekade et al.

(10) Patent No.: US 9,896,614 B2
(45) Date of Patent: Feb. 20, 2018

(54) DELAYED ACID BREAKER SYSTEMS FOR FILTERCAKES

(71) Applicant: Halliburton Energy Services, Inc., Houston, TX (US)

(72) Inventors: Rahul Vilas Mekade, Panvel (IN); Mallikarjuna Shroff Rama, Pune (IN); Lalit Pandurang Salgaonkar, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/516,625

(22) PCT Filed: Nov. 5, 2014

(86) PCT No.: PCT/US2014/064160
§ 371 (c)(1),
(2) Date: Apr. 3, 2017

(87) PCT Pub. No.: WO2016/072985
PCT Pub. Date: May 12, 2016

(65) Prior Publication Data
US 2017/0267912 A1    Sep. 21, 2017

(51) Int. Cl.
*C09K 8/52* (2006.01)
*C09K 8/03* (2006.01)
(Continued)

(52) U.S. Cl.
CPC ............... *C09K 8/52* (2013.01); *C09K 8/035* (2013.01); *C09K 8/72* (2013.01); *E21B 37/00* (2013.01);
(Continued)

(58) Field of Classification Search
CPC . C09K 8/52; C09K 8/03; C09K 8/035; C09K 8/72; E21B 37/00
See application file for complete search history.

(56) References Cited

U.S. PATENT DOCUMENTS

| | | |
|---|---|---|
| 4,808,189 A | 2/1989 | Oishi et al. |
| 6,596,263 B1 | 7/2003 | Schoon et al. |

(Continued)

FOREIGN PATENT DOCUMENTS

| | | | |
|---|---|---|---|
| EP | 0681481 B1 | 11/2002 | |
| GB | 2519388 A | * 4/2015 | ............. C09K 8/524 |

OTHER PUBLICATIONS

International Search Report and Written Opinion dated Jun. 29, 2015; International PCT Application No. PCT/US2014/064160.
(Continued)

*Primary Examiner* — Zakiya W Bates
*Assistant Examiner* — Crystal J Miller
(74) *Attorney, Agent, or Firm* — McGuireWoods LLP

(57) ABSTRACT

A delayed acid breaker comprising: an inclusion compound comprising: a host molecule of cyclodextrin; and a guest molecule of an acid precursor, wherein the acid precursor hydrolyzes in water to form an acid, and wherein the acid degrades at least a portion of a filtercake located within a subterranean formation. A method of removing a filtercake from a subterranean formation comprising: introducing the delayed acid breaker into the subterranean formation; and allowing the acid precursor to form the acid after a desired amount of time has elapsed since the introduction of the delayed acid breaker into the subterranean formation.

18 Claims, 1 Drawing Sheet

(51) Int. Cl.
  *E21B 37/00* (2006.01)
  *C09K 8/72* (2006.01)
  *C09K 8/035* (2006.01)
  *E21B 21/00* (2006.01)
(52) U.S. Cl.
  CPC ........ *C09K 2208/26* (2013.01); *E21B 21/003* (2013.01)

(56) References Cited

U.S. PATENT DOCUMENTS

| | | | |
|---|---|---|---|
| 7,115,586 | B2 | 10/2006 | Loftsson |
| 2008/0078549 | A1 | 4/2008 | Moorehead et al. |
| 2011/0220358 | A1 | 9/2011 | Robinson et al. |
| 2013/0112413 | A1 | 5/2013 | Muthusamy et al. |
| 2013/0267444 | A1 | 10/2013 | Thaemlitz |
| 2014/0128295 | A1 | 5/2014 | Wagles et al. |
| 2016/0304765 | A1* | 10/2016 | Kadam ............... C09K 8/72 |
| 2016/0362597 | A1* | 12/2016 | Harris ............... C09K 8/524 |

OTHER PUBLICATIONS

Challa, Rajeswari, et al. "Cyclodextrins in drug delivery: an updated review." Aaps Pharmscitech 6.2 (2005): E329-E357.

Villaverde, Jaime, et al. "Preparation and characterization of inclusion complex of norflurazon and β-cyclodextrin to improve herbicide formulations." Journal of agricultural and food chemistry 52.4 (2004): 864-869.

Kayaci, Fatma, and Tamer Uyar. "Solid inclusion complexes of vanillin with cyclodextrins: their formation, characterization, and high-temperature stability." Journal of agricultural and food chemistry 59.21 (2011): 11772-11778.

Szejtli, J. (1985), Cyclodextrins in Pesticides. Starch/Stärke, 37: 382-386. doi:10.1002/star.19850371106.

Manolikar, M. K., and M. R. Sawant. "Study of solubility of isoproturon by its complexation with β-cyclodextrin." Chemosphere 51.8 (2003): 811-816.

Mekade, Rahul Vilas, and Manohar Ramchandra Sawant. "Complexation of Triclopyr Butoxy Ethyl Ester with β-Cyclodextrin." Journal of Macromolecular Science Part A: Pure and Applied Chemistry 43.8 (2006): 1237-1245.

Zhang, Anping, et al. "Characterization of inclusion complexation between fenoxaprop-p-ethyl and cyclodextrin." Journal of agricultural and food chemistry 53.18 (2005): 7193-7197.

Sauceau, Martial, Elisabeth Radler, and Jacques Fages. "Preparation of inclusion complex of piroxicam with cyclodextrin by using supercritical carbon dioxide." The Journal of Supercritical Fluids 47.2 (2008): 326-332.

Del Valle, EM Martin. "Cyclodextrins and their uses: a review." Process biochemistry 39.9 (2004): 1033-1046.

Kamiya, Mamoru, Kaori Nakamura, and Chizuko Sasaki. "Inclusion effects of cyclodextrins on photodegradation rates of parathion and paraoxon in aquatic medium." Chemosphere 28.11 (1994): 1961-1966.

Peréz-Martinéz, J. I., et al. "2, 4-D-α-Cyclodextrin Complexes." Journal of thermal analysis and calorimetry 51.3 (1998): 965-972.

Rawat, S., and S. K. Jain. "Rofecoxib-β-cyclodextrin inclusion complex for solubility enhancement." Die Pharmazie-An International Journal of Pharmaceutical Sciences 58.9 (2003): 639-641.

Matsuda, Hajime, et al. "Inclusion complexation of p-hydroxybenzoic acid esters with 2-hydroxypropyl-β-cyclodextrins. On changes in solubility and antimicrobial activity." Chemical and pharmaceutical bulletin 41.8 (1993): 1448-1452.

Shirse, Prabhakar, K. Sreenivasa Rao, and Mohammed Majid Iqbal. "Formulation and evaluation of cyclodextrin inclusion complex tablets of water insoluble drug-glimipiride." Int J Res Pharm Chem 2.1 (2012): 222-231.

Sapkal, N. P., et al. "Evaluation of some methods for preparing gliclazide-β-cyclodextrin inclusion complexes." Tropical journal of pharmaceutical research 6.4 (2007): 833-840.

Zaibunnisa, A. H., R. Siti, and A. Nur. "Stabilisation of curcumin with γ-cyclodextrin: phase solubility study and its characterization." International Proceedings of Chemical, Biological and Environmental Engineering 7 (2011): 9-13.

Petrović, Goran M., Blaga Stojčeva-Radovanović, and O. Jovanović. "Characterization of pesticide-β-cyclodextrin inclusion complexes in aqueous solution." Facta universitatis-series: Physics, Chemistry and Technology 3.2 (2005): 151-155.

Nicolescu, Camelia, Carina Arama, and Crina-Maria Monciu. "Preparation and characterization of inclusion complexes between repaglinide and β-cyclodextrin, 2-hydroxypropyl-β-cyclodextrin and randomly methylated β-cyclodextrin." Farmacia 58.1 (2010): 78-88.

* cited by examiner

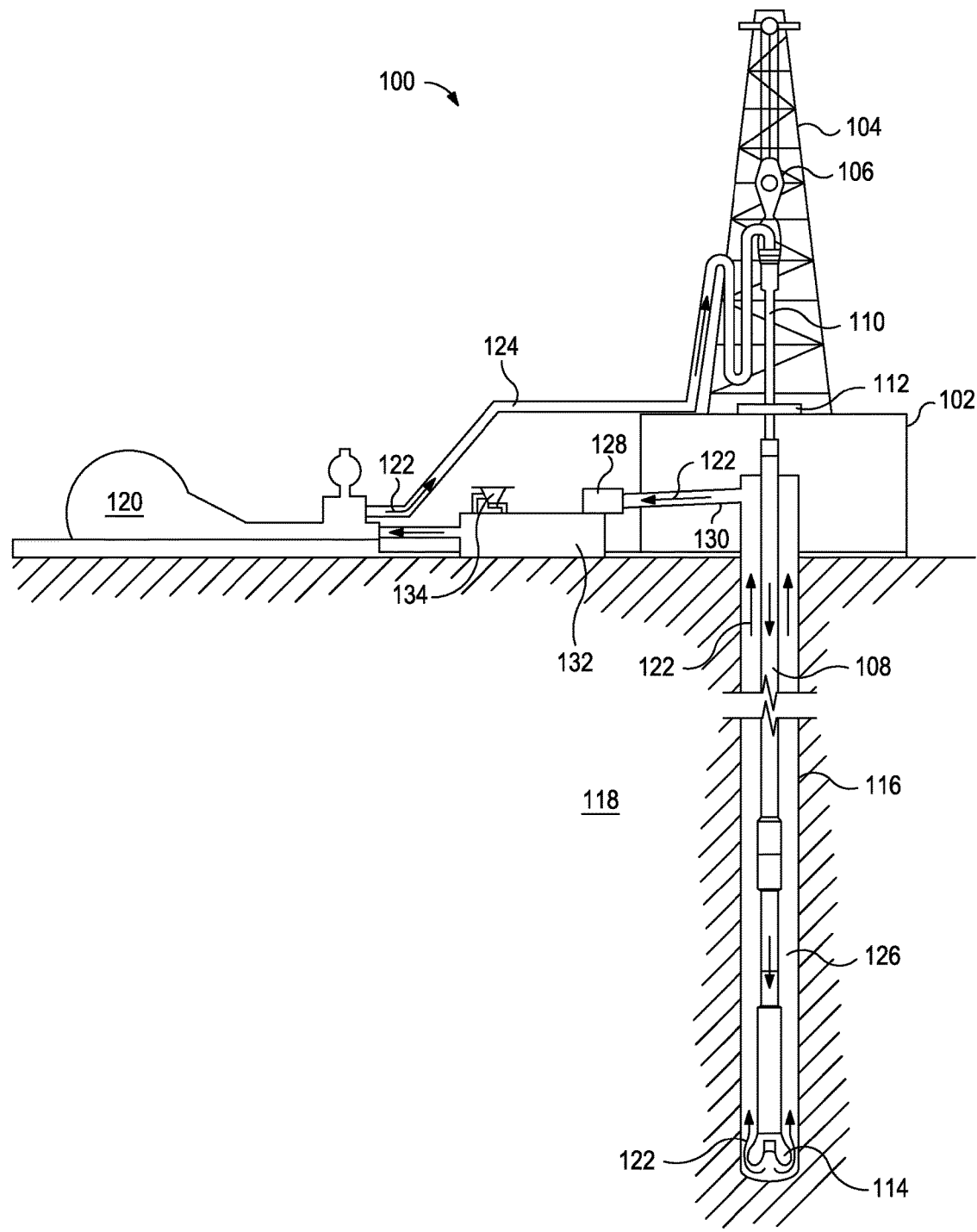

DELAYED ACID BREAKER SYSTEMS FOR FILTERCAKES

TECHNICAL FIELD

A variety of additives can be used to combat fluid loss of a drilling fluid into a subterranean formation. The fluid loss additives can be included in the fluid and function to prevent some or all of the base fluid from undesirably flowing into the formation. The fluid loss additives can form a filtercake on the wall of a wellbore. The filtercake can later be removed with a delayed acid breaker system in order to restore fluid communication with the subterranean formation.

BRIEF DESCRIPTION OF THE FIGURES

The features and advantages of certain embodiments will be more readily appreciated when considered in conjunction with the accompanying FIGURES. The figures are not to be construed as limiting any of the preferred embodiments.

FIG. 1 is a diagram illustrating a well system according to certain embodiments.

DETAILED DESCRIPTION OF THE INVENTION

Oil and gas hydrocarbons are naturally occurring in some subterranean formations. In the oil and gas industry, a subterranean formation containing oil and/or gas is referred to as a reservoir. A reservoir can be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir. The oil, gas, or water produced from a reservoir is called a reservoir fluid.

As used herein, a "fluid" is a substance having a continuous phase that can flow and conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase; whereas a heterogeneous fluid has more than one distinct phase. A colloid is an example of a heterogeneous fluid. A heterogeneous fluid can be: a slurry, which includes a continuous liquid phase and undissolved solid particles as the dispersed phase; an emulsion, which includes a continuous liquid phase and at least one dispersed phase of immiscible liquid droplets; a foam, which includes a continuous liquid phase and a gas as the dispersed phase; or a mist, which includes a continuous gas phase and liquid droplets as the dispersed phase. As used herein, the term "base fluid" means the solvent of a solution or the continuous phase of a heterogeneous fluid and is the liquid that is in the greatest percentage by volume of a treatment fluid.

A well can include, without limitation, an oil, gas, or water production well, an injection well, or a geothermal well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within approximately 100 feet radially of the wellbore. As used herein, "into a well" means and includes into any portion of the well, including into the wellbore or into the near-wellbore region via the wellbore.

A portion of a wellbore can be an open hole or cased hole. In an open-hole wellbore portion, a tubing string can be placed into the wellbore. The tubing string allows fluids to be introduced into or flowed from a remote portion of the wellbore. In a cased-hole wellbore portion, a casing is placed into the wellbore that can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

A wellbore is formed using a drill bit. A drill string can be used to aid the drill bit in drilling through a subterranean formation to form the wellbore. The drill string can include a drilling pipe. During drilling operations, a drilling fluid, sometimes referred to as a drilling mud, may be circulated downwardly through the drilling pipe and back up the annulus between the wellbore and the outside of the drilling pipe. The drilling fluid performs various functions, such as cooling the drill bit, maintaining the desired pressure in the well, and carrying drill cuttings upwardly through the annulus between the wellbore and the drilling pipe.

Additives can be used in a drilling fluid. If the permeability of the subterranean formation is great enough, then some or all of the base fluid of a drilling fluid can undesirably penetrate into the subterranean formation instead of being circulated back towards the wellhead, known as fluid loss. The larger the pore sizes and interconnectivity of the pores, the greater the volume of base fluid that can be lost into the formation. Fluid loss additives can be used in a drilling fluid to help inhibit or prevent fluid loss.

The fluid loss additives can form a filtercake on the wall of the wellbore. A filtercake is the residue deposited on a permeable medium when a slurry, such as a drilling fluid, is forced against the medium under pressure. The filtrate is the liquid that passes through the medium, leaving the cake on the medium. In filtercake deposition, the slurry, that commonly includes water, a gelling agent, calcium carbonate, and polymers, is introduced into the open-hole wellbore. The fluid flows into a desired portion of the well. The ingredients in the fluid form the filtercake. The filtercake can be used to bind fines, such as sand, together, and prevent fluid loss into the subterranean formation.

It is often desirable to remove at least a portion of a filtercake after deposition onto the wellbore wall. The filtercake is often removed in order to restore fluid flow between the wellbore and the subterranean formation. A delayed acid breaker system can be used to remove the filtercake and restore fluid communication. A delayed acid breaker system can include the introduction of an acid precursor into the well. As used herein, an "acid precursor" is an organic compound (e.g., an ester of orthoformate or amide) that hydrolyzes and forms an acid in the presence of water. The acid precursor hydrolyzes when in contact with a water-based wellbore fluid to form an acid. The acid then breaks down and removes the filtercake.

The rate at which an acid precursor hydrolyzes to form the acid is affected by temperature. Therefore, in higher temperature wellbores, for example wellbores in excess of about 250° F. (121° C.), the rate of acid formation may be too fast for the desired time of delay to occur, resulting in premature degradation of the filtercake. The lack of adequate delay can also result in an incomplete removal of the filtercake and the formation of pin holes within the filtercake without effectively cleaning up the entire filtercake. Moreover, a common gelling agent of cellulose derivatives, such as hydroxyethyl cellulose "HEC" that can be used for the purpose of delaying the action of breakers, can leave a residue on the wellbore wall and even cause damage to the formation in the form of reduced permeability. Therefore, there is a continuing need for an improved breaker recipe that has the ability to provide a desired delay of filtercake removal in higher temperature wellbores without having to worry about residues and formation damage.

An inclusion compound can be used as a delayed acid breaker for removing a filtercake. The host compound that forms the cavity of the inclusion compound can be cyclodextrin. The guest compound that resides within the cavity can be an acid precursor. The cyclodextrin can be a gelling agent and the acid precursor can be the delayed acid breaker.

An inclusion compound is a complex in which one chemical compound "host" forms a cavity in which molecules of a second "guest" compound are located. The definition of inclusion compounds is very broad, extending to channels formed between molecules in a crystal lattice in which guest molecules can fit. The cage structure of the cavity helps protect the guest molecule from the surrounding environment. An inclusion compound can also have different properties than the two molecules would individually. For example, an inclusion compound of a cyclodextrin host molecule and an acid precursor as the guest molecule can have improved solubility and thermal stability as well as a lower volatility and flash point.

According to certain embodiments, a delayed acid breaker comprises: an inclusion compound comprising: a host molecule of cyclodextrin; and a guest molecule of an acid precursor, wherein the acid precursor hydrolyzes in water to form an acid, and wherein the acid degrades at least a portion of a filtercake located within a subterranean formation.

According to certain other embodiments, a method of removing a filtercake from a subterranean formation comprises: introducing the delayed acid breaker into the subterranean formation; and allowing the acid precursor to form the acid after a desired amount of time has elapsed since the introduction of the delayed acid breaker into the subterranean formation.

It is to be understood that the discussion of preferred embodiments regarding the delayed acid breaker or any ingredient in the delayed acid breaker (e.g., the acid precursor) are intended to apply to the method, composition, and system embodiments. Any reference to the unit "gallons" means U.S. gallons.

The delayed acid breaker can be included in a treatment fluid. The treatment fluid can include a base fluid. The treatment fluid can be a homogenous fluid or a heterogeneous fluid, wherein the base fluid is the continuous phase of the heterogeneous fluid. Any of the phases of a heterogeneous fluid can include dissolved substances or undissolved solids. The base fluid can include water. The water can be selected from the group consisting of freshwater, brackish water, saltwater, and any combination thereof. The water can include a water-soluble salt. Preferably, the salt is selected from sodium chloride, calcium chloride, calcium bromide, potassium chloride, potassium bromide, magnesium chloride, and any combination thereof in any proportion.

The delayed acid breaker is introduced into a subterranean formation. The subterranean formation can be penetrated by a wellbore. A fluid, such as a drilling fluid, can be introduced into the wellbore. The fluid can form a filtercake on the wall of the wellbore. The fluid can also form a filtercake a certain distance into the subterranean formation from the wellbore, such as a few feet into any pores of the subterranean formation. In this manner, the filtercake that is formed is not restricted to just the wall of the wellbore, but rather, can penetrate a certain distance into the subterranean formation. The filtercake that is formed can be degraded by the acid. For example, some or all of the ingredients that make up the filtercake can be acid-soluble. In this manner, some or all of the filtercake can be degraded (including dissolved or broken down molecularly into smaller fragments) such that degraded filtercake can be removed from the subterranean formation via the wellbore. Preferably, the acid degrades all of the filtercake such that the permeability of the subterranean formation is restored to a pre-filtercake state. Accordingly, the degraded filtercake does not leave any residue on surfaces of the subterranean formation or wellbore. According to certain embodiments, the delayed acid breaker also does not leave a substantial amount of residue such that the permeability of the formation is affected.

The delayed acid breaker is an inclusion compound. The inclusion compound includes a host molecule and a guest molecule. The guest molecule is positioned within the host molecule. The host molecule can form a cage that partially or completely surrounds the guest molecule. The inclusion compound can have desirable properties compared to acid precursors that are not part of an inclusion compound. For example, the inclusion compound can have a decreased volatility or flash point or other properties that impact how the compound is handled due to health and safety issues.

The host molecule is a cyclodextrin. The host molecule can be β-cyclodextrin, α-cyclodextrin, or γ-cyclodextrin.

The guest molecule is an acid precursor. The acid precursor can be any molecule that hydrolyzes to form an acid in the presence of water. For example, the acid precursor can be an ester of a carboxylic acid. The carboxylic acid can be, without limitation, formic acid, lactic acid, acetic acid, propionic acid, tartaric acid, or any aliphatic or aromatic acid. When in the presence of water, the acid precursor can hydrolyze to form the acid. The acid that is formed can be the carboxylic acid, such as formic acid, lactic acid, acetic acid, propionic acid, tartaric acid, or any aliphatic or aromatic acid. The acid can degrade the filtercake as discussed above. The acid precursor should be capable of forming the inclusion compound with the cyclodextrin. The acid precursor can be insoluble in the base fluid when contained within the cyclodextrin host molecule.

The ratio of host molecule to guest molecule can be in the range of about 2:1 to about 1:2. The inclusion compound can be formed by a variety of methods including, but not limited to, co-precipitation, co-evaporation, and kneading.

The cyclodextrin host molecule delays the acid precursor guest molecule from coming in contact with a fluid, such as the base fluid of the treatment fluid or another wellbore fluid. According to certain embodiments, the host molecule releases the guest molecule. The rate at which the host molecule releases the guest molecule can be a function of temperature and the specific acid precursor used to form the inclusion compound. For example, at higher temperatures, the faster the rate of release of the guest molecule; and at lower temperatures, the slower the rate of release of the guest molecule. Accordingly, the rate of release of the guest molecule can be determined by the bottomhole temperature of the wellbore. As used herein, the term "bottomhole" means the location at which the delayed acid breaker is located. The rate of release of the guest molecule can delay hydrolysis of the acid precursor into the acid. The desired amount of time of the delay of acid formation since introduction into the subterranean formation can be in the range of about 6 to about 48 hours or more. The desired amount of time can be dependent on the specific oil or gas operation being performed.

According to certain embodiments, the delayed acid breaker is used in a subterranean formation having a bottomhole temperature above about 250° F. (121° C.). In this manner, the formation of the acid from the acid precursor is able to be delayed for the desired amount of time; whereas, the same acid precursor that is not part of an inclusion compound would not be able to be delayed for the desired amount of time due to the higher temperature causing the hydrolysis to occur at an undesirably high rate. Accordingly, the delayed acid breaker can be used in these higher temperature wellbores that previous acid precursors were not able to be used. In yet other embodiments, the inclusion compound is used whenever extended delay of more than about 24 hours to 96 hours is required, even if the temperatures are in the range of 80° F. to 250° F. (27° C. to 121° C.).

The host molecule can begin degrading after introduction into the subterranean formation. The acid precursor guest molecule is slowly released into the surrounding wellbore fluid as the host molecule degrades. The rate of release of the acid precursor is dependent on the rate of degradation of the host molecule. Once released, the acid precursor hydrolyzes in the presence of water to form the acid. The rate of hydrolysis can be dependent on the temperature of the water. Generally, at higher temperatures, the faster the rate of hydrolysis, and vice versa. The acid can then begin degradation of the filtercake.

According to certain embodiments, the acid precursor is selected based on the bottomhole temperature to provide the desired amount of delay of filtercake removal.

The concentration of the delayed acid breaker can be selected such that a desired concentration of acid is formed from the acid precursor. The desired concentration of acid can be selected such that some or all of the filtercake is degraded. The concentration of the delayed acid breaker can also be in the range of about 1% to about 35%, alternatively about 5% to about 25%, by weight of the base fluid.

The treatment fluid can further include other additives. Examples of additives include, but are not limited to, a shale or clay stabilizer, a viscosifier, a viscosity-reducing agent, a friction reducer, a defoaming agent, elastomers, a mechanical property enhancing additive, a gas migration control additive, a thixotropic additive, and combinations thereof.

The methods can include forming the treatment fluid. The step of forming can include mixing the ingredients of the treatment fluid together using a suitable mixing apparatus. The treatment fluid can be in a pumpable state before and during introduction into the subterranean formation. If the treatment fluid does not contain water, then a second fluid including water can be introduced into the subterranean formation to hydrolyze the acid precursor to form the acid.

The exemplary fluids disclosed herein can directly or indirectly affect one or more components or pieces of equipment associated with the preparation, delivery, recapture, recycling, reuse, and/or disposal of the disclosed fluids. For example, and with reference to FIG. 1, the disclosed fluids can directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 can include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates drilling fluid 122 through a feed pipe 124 to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the borehole 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (i.e., a mud pit). While illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the scope of the disclosure.

One or more of the disclosed fluids can be added to the drilling fluid 122 via a mixing hopper 134 communicably coupled to or otherwise in fluid communication with the retention pit 132. The mixing hopper 134 can include, but is not limited to, mixers and related mixing equipment known to those skilled in the art. In other embodiments; however, the disclosed fluids can be added to the drilling fluid 122 at any other location in the drilling assembly 100. In at least one embodiment, for example, there could be more than one retention pit 132, such as multiple retention pits 132 in series. Moreover, the retention put 132 can be representative of one or more fluid storage facilities and/or units where the disclosed fluids can be stored, reconditioned, and/or regulated until added to the drilling fluid 122.

As mentioned above, the disclosed fluids can directly or indirectly affect the components and equipment of the drilling assembly 100. For example, the disclosed fluids can directly or indirectly affect the fluid processing unit(s) 128 which can include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the exemplary fluids.

The disclosed fluids can directly or indirectly affect the pump 120, which representatively includes any conduits, pipelines, trucks, tubulars, and/or pipes used to fluidically convey the fluids downhole, any pumps, compressors, or motors (e.g., topside or downhole) used to drive the fluids into motion, any valves or related joints used to regulate the pressure or flow rate of the fluids, and any sensors (i.e., pressure, temperature, flow rate, etc.), gauges, and/or combinations thereof, and the like. The disclosed fluids can also directly or indirectly affect the mixing hopper 134 and the retention pit 132 and their assorted variations.

The disclosed fluids can also directly or indirectly affect the various downhole equipment and tools that can come into contact with the fluids such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed fluids can also directly or indirectly affect any downhole heat exchangers, valves and corresponding actuation devices, tool seals, packers and other wellbore isolation devices or components, and the like associated with the wellbore 116. The disclosed fluids can also directly or indirectly affect the drill bit 114, which can include, but is not limited to, roller cone bits, PDC bits, natural diamond bits, any hole openers, reamers, coring bits, etc.

While not specifically illustrated herein, the disclosed fluids can also directly or indirectly affect any transport or delivery equipment used to convey the fluids to the drilling assembly 100 such as, for example, any transport vessels, conduits, pipelines, trucks, tubulars, and/or pipes used to fluidically move the fluids from one location to another, any pumps, compressors, or motors used to drive the fluids into motion, any valves or related joints used to regulate the pressure or flow rate of the fluids, and any sensors (i.e., pressure and temperature), gauges, and/or combinations thereof, and the like.

The treatment fluid for removal of the filtercake that can be formed during the drilling process can be introduced into the subterranean formation using some or all of the same equipment, such as pumps, to perform the drilling operation.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention.

As used herein, the words "comprise," "have," "include," and all grammatical variations thereof are each intended to have an open, non-limiting meaning that does not exclude additional elements or steps. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of removing a filtercake from a subterranean formation comprising:
   introducing a delayed acid breaker into the subterranean formation, wherein the delayed acid breaker is an inclusion compound comprising:
   (A) a host molecule of cyclodextrin; and
   (B) a guest molecule of an acid precursor; wherein the inclusion compound is formed by a method selected from the group consisting of co-precipitation, co-evaporation, kneading, and any combination thereof; wherein the acid precursor hydrolyzes in water to form an acid, and
   wherein the acid degrades at least a portion of the filtercake; and
   allowing the acid precursor to form the acid after a desired amount of time has elapsed since the introduction of the delayed acid breaker into the subterranean formation.

2. The method according to claim 1, wherein the delayed acid breaker is included in a treatment fluid, and wherein the treatment fluid comprises a base fluid.

3. The method according to claim 2, wherein the base fluid comprises water, and wherein the water is selected from the group consisting of freshwater, brackish water, saltwater, and any combination thereof.

4. The method according to claim 1, wherein the delayed acid breaker does not leave an amount of residue on the subterranean formation sufficient to reduce the permeability of the subterranean formation.

5. The method according to claim 1, wherein the acid precursor is an ester of a carboxylic acid.

6. The method according to claim 5, wherein the carboxylic acid is formic acid, lactic acid, acetic acid, propionic acid, tartaric acid, or any aliphatic or aromatic acid.

7. The method according to claim 1, wherein the ratio of host molecule to guest molecule is in the range of about 2:1 to about 1:2.

8. The method according to claim 1, wherein the subterranean formation has a bottomhole temperature in the range of about 80° F. to 450° F.

9. The method according to claim 1, wherein the concentration of the delayed acid breaker is about 1% to about 35%.

10. The method according to claim 1, wherein a fluid forms the filtercake in the subterranean formation.

11. The method according to claim 10, wherein some or all of the filtercake that is formed is degraded by the acid, and wherein the degraded filtercake is removed from the subterranean formation via the wellbore.

12. The method according to claim 1, wherein the host molecule begins to release the guest molecule after introduction into the subterranean formation.

13. The method according to claim 12, wherein the rate of release of the host molecule is determined by the bottomhole temperature of the subterranean formation.

14. The method according to claim 12, wherein after being released from the host molecule, the acid precursor hydrolyzes in the presence of water to form the acid.

15. The method according to claim 14, wherein the acid begins to degrade the filtercake after hydrolysis of the acid precursor.

16. A system comprising:
a subterranean formation;
a filtercake located within a portion of the subterranean formation; and
a delayed acid breaker, wherein the delayed acid breaker is an inclusion compound comprising:
   (A) a host molecule of cyclodextrin; and
   (B) a guest molecule of an acid precursor; wherein the inclusion compound is formed by a method selected from the group consisting of co-precipitation, co-evaporation, kneading, and any combination thereof; wherein the acid precursor hydrolyzes in water to form an acid, and
   wherein the acid degrades at least a portion of the filtercake.

17. The system according to claim 16, wherein the subterranean formation has a bottomhole temperature in the range of about 80° F. to 450° F.

18. A delayed acid breaker comprising:
an inclusion compound comprising:
   a host molecule of cyclodextrin; and
   a guest molecule of an acid precursor; wherein the inclusion compound is formed by a method selected from the group consisting of co-precipitation, co-evaporation, kneading, and any combination thereof; wherein the acid precursor hydrolyzes in water to form an acid; and wherein the acid degrades at least a portion of a filtercake located within a subterranean formation.

* * * * *